(12) United States Patent
Okada (10) Patent No.: US 7,094,078 B2
(45) Date of Patent: Aug. 22, 2006

(54) DEVICE WITH UNIVERSAL SERIAL BUS (USB) CONNECTOR

(75) Inventor: Yasuo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/019,254

(22) Filed: Dec. 23, 2004

(65) Prior Publication Data

US 2005/0160193 A1   Jul. 21, 2005

(30) Foreign Application Priority Data

Dec. 26, 2003  (JP)  ............... 2003-435051
Dec. 26, 2003  (JP)  ............... 2003-435250

(51) Int. Cl.
*H01R 13/44* (2006.01)

(52) U.S. Cl. ...................... 439/135; 439/149
(58) Field of Classification Search ................ 439/135, 439/147–149, 138, 11, 1
See application file for complete search history.

(56) References Cited

U.S. PATENT DOCUMENTS

| | | | |
|---|---|---|---|
| 6,394,813 B1* | 5/2002 | Stout et al. ................... | 439/11 |
| 6,786,734 B1* | 9/2004 | Yu ................................. | 439/11 |
| 6,883,718 B1* | 4/2005 | Le et al. ...................... | 235/492 |
| 6,890,188 B1* | 5/2005 | Le ............................... | 439/76.1 |
| 6,893,267 B1* | 5/2005 | Yueh ............................. | 439/8 |
| 6,924,996 B1* | 8/2005 | Sugawara ..................... | 365/51 |
| 6,932,629 B1* | 8/2005 | Ikenoue ........................ | 439/138 |
| 2004/0229478 A1* | 11/2004 | Chen ............................ | 439/11 |

FOREIGN PATENT DOCUMENTS

JP   2001-294259   10/2001

* cited by examiner

*Primary Examiner*—Hae Moon Hyeon
(74) *Attorney, Agent, or Firm*—Oblon, Spivak, McClelland, Maier & Neustadt, P.C.

(57) ABSTRACT

A memory main body including a Universal Serial Bus (USB) connector and a connector protection member protecting the USB connector and removed in a usage state, the memory main body including a first member provided at a side of the USB connector, and a second member provided at a side opposite thereto, the first member and the second member being connected with each other so as to rotate relative to each other around an axis of the memory main body, and the memory main body further including a protection member housing space portion housing and holding the connector protection member in a removal state.

14 Claims, 8 Drawing Sheets

DEVICE WITH UNIVERSAL SERIAL BUS (USB) CONNECTOR

CROSS-REFERENCE TO RELATED APPLICATION

This application is based upon and claims the benefit of priority from prior Japanese Patent Application Nos. 2003-435250 and 2003-435051, both filed on Dec. 26, 2003, the entire contents of which are incorporated herein by reference.

BACKGROUND OF THE INVENTION

1. Field of the Invention

The present invention relates to a device with a USB connector, such as a USB memory.

2. Background Art

Conventionally, various devices are connected with each other using USB cables. For example, a peripheral device is connected to a USB female connector of a notebook type personal computer by using a USB cable. There is also a case where a USB male connector connecting to such a USB female connector is provided on a peripheral device itself so that the peripheral device is connected directly to, e.g., a notebook type personal computer without using any USB cable. An example of such a case is the use of a so-called USB memory. A USB memory can be defined as a memory card provided with a USB male connector. In such a USB memory, a memory chip, a controller, etc. are housed in a housing, and a USB male connector connecting to such circuits is provided on one end. A protection cap (or protection member) for preventing the memory portion from suffering electrostatic discharge damage or the terminal portion of the male connector from short-circuiting is removably provided on the USB male connector. In a usage state, after the cap is removed, the USB male connector of the USB memory is connected to the USB female connector of an OA device such as a personal computer.

Figure 19:
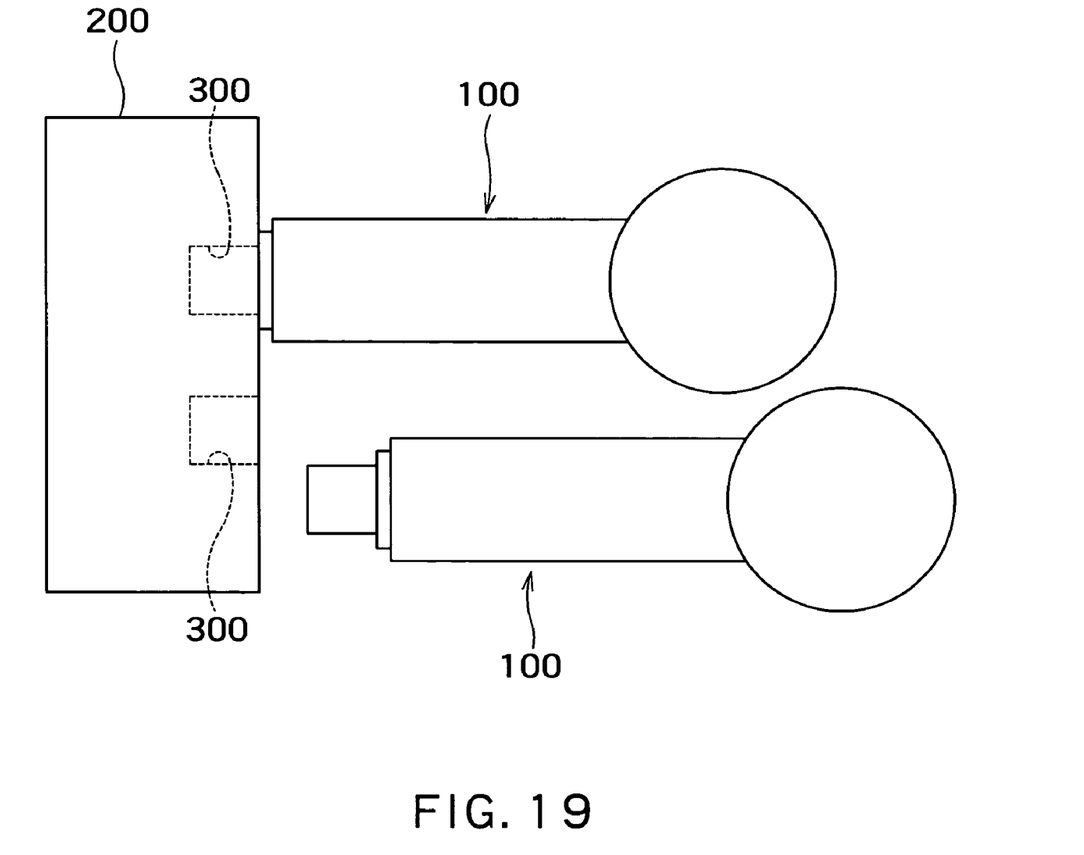
FIG. 19 is an explanatory drawing of a conventional device in a disabled state.

Recently, personal computers have become remarkably smaller. With such a trend, the distance between USB female connectors provided on a personal computer, etc. has decreased considerably. Accordingly, when a user intends to connect two peripheral devices such as USB memories to USB female connectors of a personal computer at the same time, depending on the type of the peripheral devices, the peripheral devices could interfere with each other, so that it would not be possible to connect these devices to female connectors of a device of the personal computer, as shown as the peripheral devices 100, 100 and the female connectors 300 of a device 200 in FIG. 19. This may also happen when a cartoon character or the like is attached to the other end of the USB memory.

Thus, conventionally, there have been cases where a plurality of devices such as USB memories each having a USB male connector cannot be connected to a device such as a personal computer provided with USB female connectors.

Figure 20:
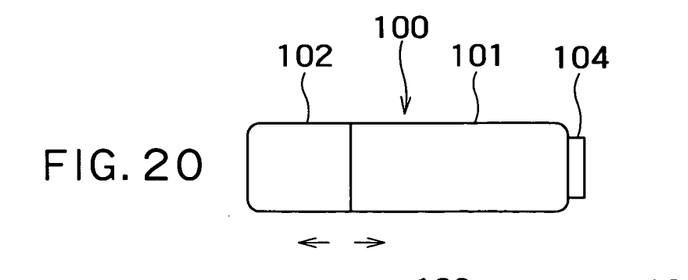
FIG. 20 is an explanatory drawing showing a step of a process of changing a conventional USB memory into a usage state.
Figure 21:
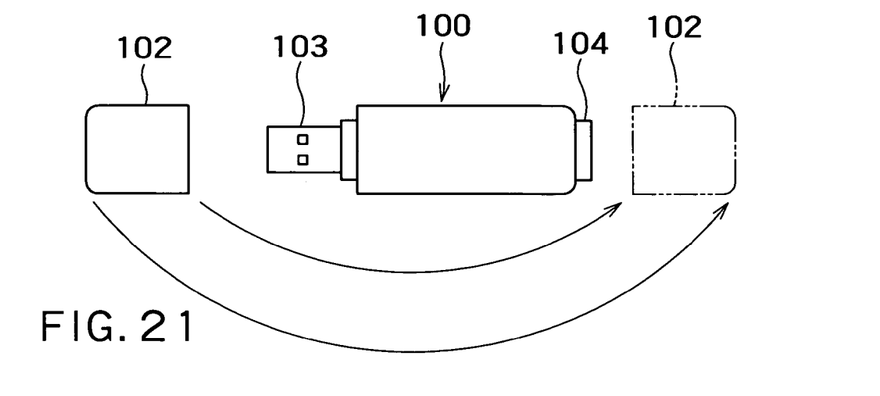
FIG. 21 is an explanatory drawing showing a step of a process of changing a conventional USB memory into a usage state.
Figure 22:
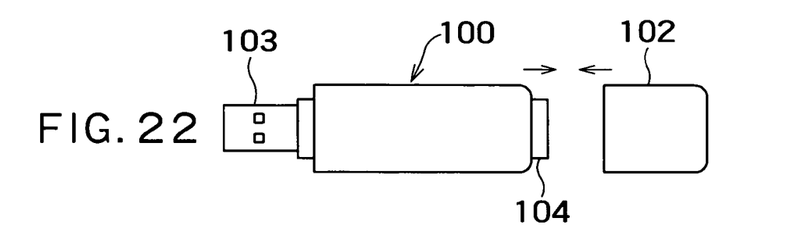
FIG. 22 is an explanatory drawing showing a step of a process of changing a conventional USB memory into a usage state.
Figure 23:
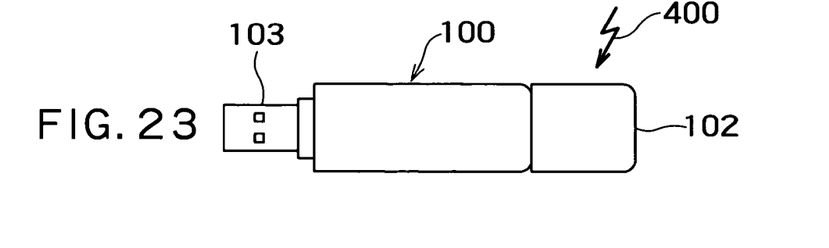
FIG. 23 is an explanatory drawing showing a usage state of a conventional USB memory.
Figure 24:
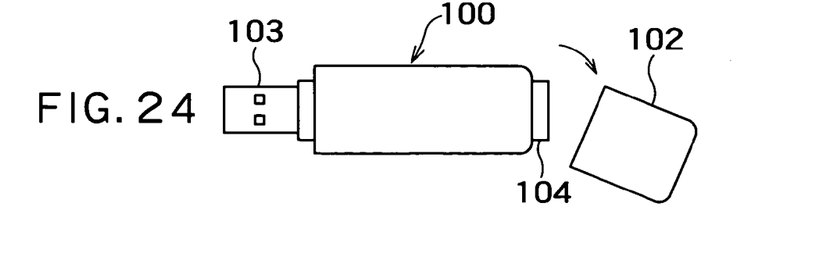
FIG. 24 is an explanatory drawing showing a usage state of a conventional USB memory.

When a device including the aforementioned conventional USB connector is actually being used, it is highly possible that the cap thereof is lost. In order to prevent this, conventionally, the cap, which is removed, is put on the other end of the main body, as in the case of a fountain pen. However, the cap can be unexpectedly easily detached from the main body and lost. FIGS. 20 to 24 show such a case. That is to say, a cap 102 of the USB memory 100 is removed from a memory main body 101 to expose a USB male connector 103 (FIG. 20, FIG. 21). The removed cap 102 is fitted on a projection 104 for holding the cap provided on an end of the main body 101 (FIG. 22). The USB memory 100 is used in this state. In such a usage state, it is often possible that an external force 400 is applied to the cap 102 (FIG. 23). The cause of this external force, for example, is that a USB cable connecting to other peripheral devices, or a cable connecting a mouse with a personal computer, etc. hits the cap 102. On such an occasion, the cap 102 can be inevitably easily detached from the projection 104, i.e., separated from the memory main body 101 (FIG. 24). The cap 102 can be lost in such a case. In order to ensure the engagement between the cap 102 and the projection 104, various measures, e.g., the increase in size of the projection 104, the addition of a completely different engagement maintaining mechanism, etc., can be taken. However, from the viewpoint of avoiding an increase in size, a more complex mechanism, and the increased cost, etc., these measures are not practical for the use in USB memories.

Under the conditions required for peripheral devices that the mechanism be simple and of a low cost, it has been practically impossible for a device with a USB connector that when a USB memory thereof is used, the cap for protecting the connector is securely fixed to the main body so that it would not be removed from the main body.

SUMMARY OF THE INVENTION

A device with a USB connector according to a first aspect of an embodiment of the present invention includes:

a memory main body including therein at least a memory chip serving as a recording medium, and a USB connector electrically connecting to the memory chip provided at one end thereof; and a connector protection member removably connected to the USB connector in a first direction along an axis of the memory main body, protecting the USB connector in an attachment state, and removed in a usage state, the memory main body including a first member provided at a side of the USB connector, and a second member provided at a side opposite thereto, the first member and the second member being connected with each other so as to rotate relative to each other around an axis of the memory main body.

A device with a USB connector according to a second aspect of an embodiment of the present invention includes:

a memory main body including therein at least a memory chip serving as a recording medium, and a USB connector electrically connecting to the memory chip provided at one end thereof; and a connector protection member removably connected to the USB connector in a first direction along an axis of the memory main body, protecting the USB connector in an attachment state, and removed in a usage state, the memory main body including a protection member housing space portion housing and holding the connector protection member in a removal state by receiving the connector protection member thereinto in a thickness direction of the connector protection member along a second direction perpendicular to the first direction, the protection member housing space portion penetrating the memory main body in the second direction.

A device with a USB connector according to a third aspect of an embodiment of the present invention includes:

a memory main body including therein at least a memory chip serving as a recording medium, and a USB connector electrically connecting to the memory chip provided at one end thereof; and a connector protection member removably connected to the USB connector in a first direction along an axis of the memory main body, protecting the USB connector in an attachment state, and removed in a usage state, the memory main body including a first member provided at a side of the USB connector, and a second member provided at a side opposite thereto, the first member and the second member being connected with each other so as to rotate relative to each other around an axis of the memory main body, and the second member having a protection member housing space portion housing and holding the connector protection member in a removal state by receiving the connector protection member thereinto in a thickness direction of the connector protection member along a second direction perpendicular to the first direction, the protection member housing space portion penetrating the memory main body in the second direction.

DESCRIPTION OF THE EMBODIMENTS

Figure 1:
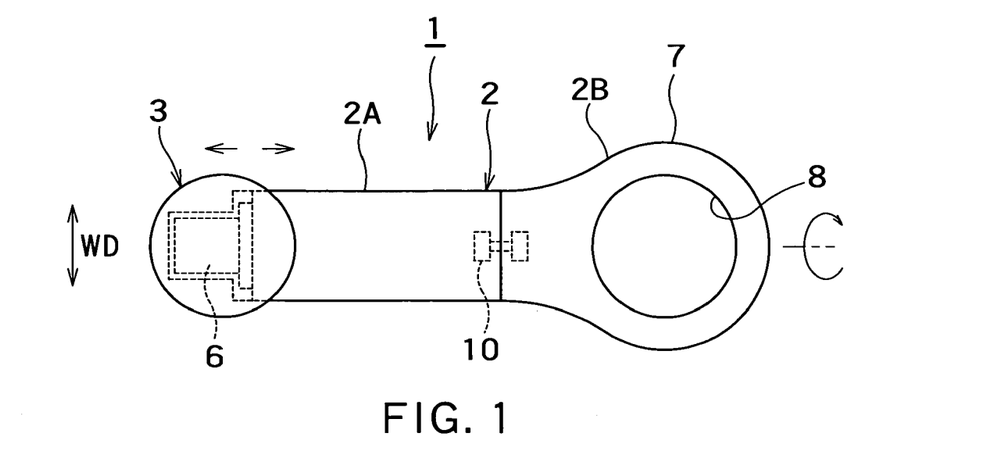
FIG. 1 is a plan view of an embodiment of the present invention.
Figure 14:
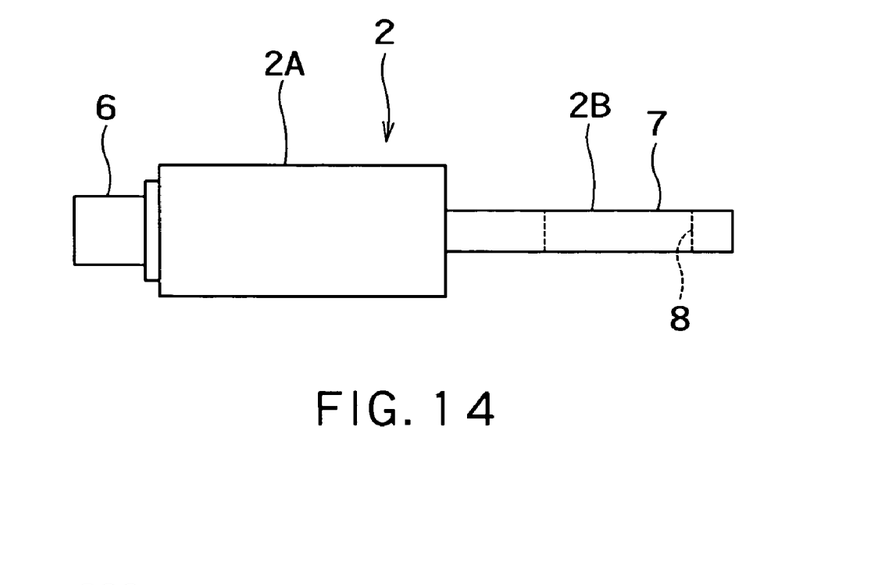
FIG. 14 is a plan view of the device of FIG. 1 after a rotation.
Figure 15:
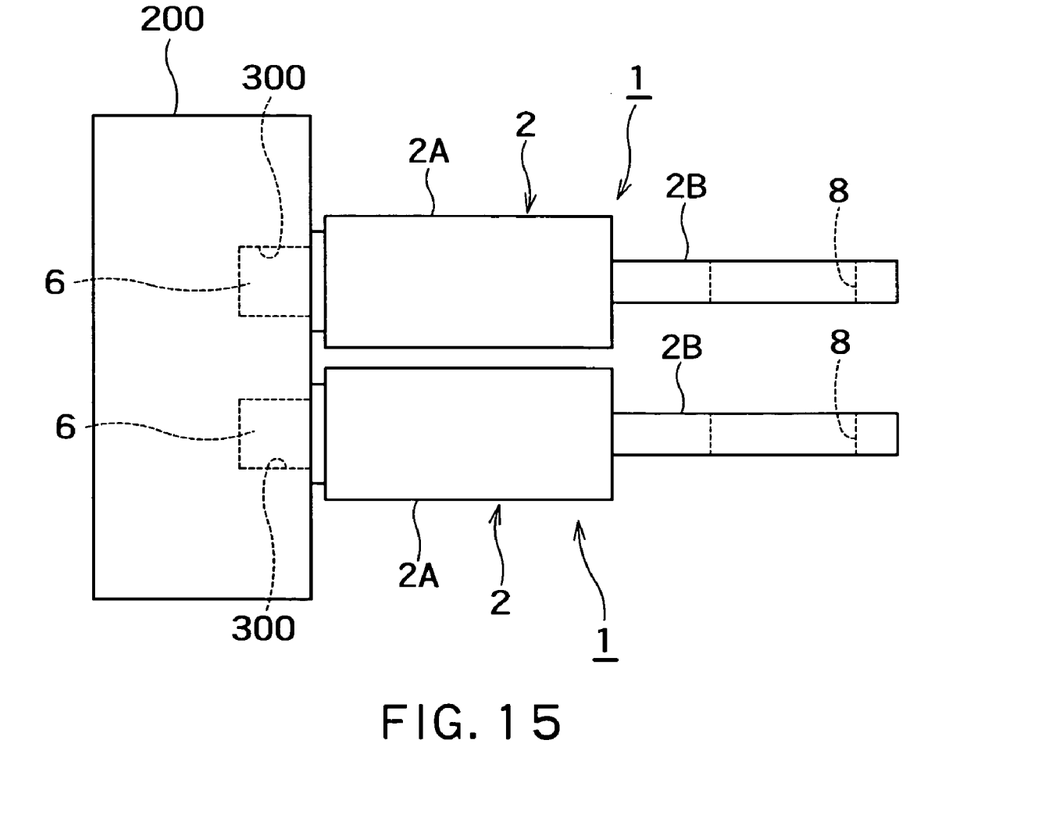
FIG. 15 is an explanatory drawing of the device shown in FIG. 14 in a connection state.

FIG. 1 is a plan view of a USB memory 1 serving as an embodiment of the present invention. As described later, in the USB memory 1, a cap 3 can be fit on a cap holding member 7 of a memory main body 2. In the USB memory 1, the side opposite to a USB male connector 6 side is wider and larger. The memory main body 2 is separated into a base member (first member) 2A and a rotation member (second member) 2B. They are rotatably fixed to each other by an axis member 10. For example, one end of the axis member 10 is rotatably embedded in a circuit board of the base member 2A, and the other end of the axis member 10 is rotatably embedded in the rotation member 2B. Other mechanisms for mutually rotating the base member 2A and the rotation member 2B can also be employed. The base member 2A and the rotation member 2B can be rotated relative to each other in this manner. FIG. 14 shows the state where the rotation member 2B is rotated around an axis by 90 degrees. With such a mechanism, as shown in FIG. 15, it is possible to connect USB memories 1,1 at the same time even when USB female connectors 300 are located close to each other. As can be understood from FIGS. 1 and 3, the thickness dimension of the rotation member 2B is smaller than the width dimension thereof. The base member 2A and the rotation member 2B can be freely rotated relative to each other, or can be roughly held in an engagement state so that the rotation can be stopped at a predetermined position. For example, a groove is formed on one of the contact surfaces of the members 2A and 2B, and a projection is formed on the other.

Figure 2A:
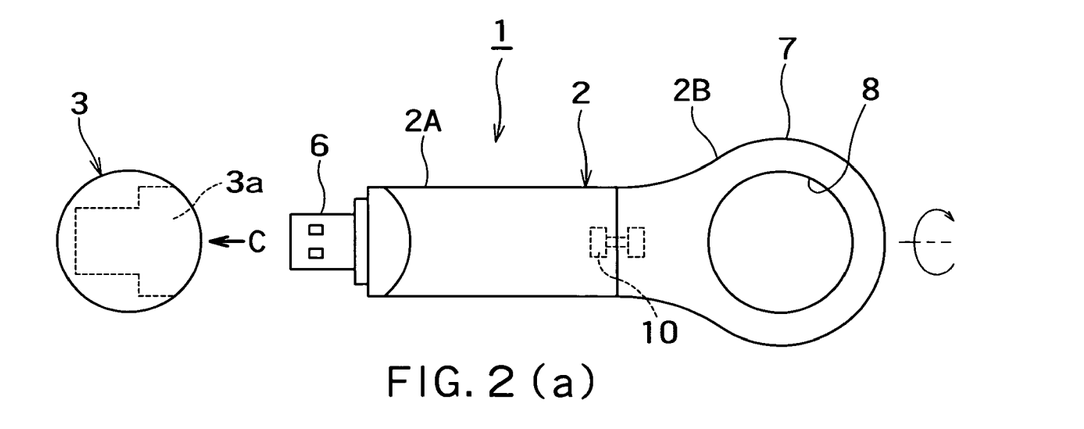
FIG. 2(a) is a plan view showing a separation state of FIG. 1.
Figure 2B:
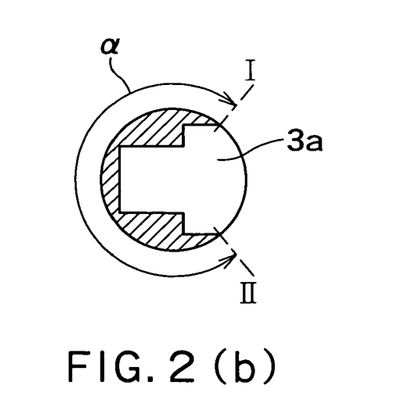
FIG. 2(b) is a sectional view of a cap.
Figure 2C:
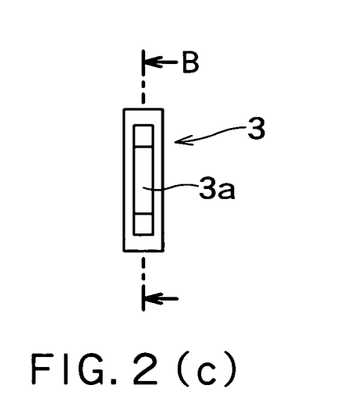
FIG. 2(c) is a side view of the cap.

In more detail, FIG. 1 is a plan view of the USB memory 1 according to an embodiment of the present invention, FIG. 2(a) is a plan view of the cap 3 serving as a component thereof in a separation state, FIG. 2(b) is a sectional view of the component (cap) 3, and FIG. 2(c) is a side view thereof. That is to say, the USB memory 1 includes the memory main body 2 and the cap 3. The memory main body 2 includes a housing having a hollow portion and a solid portion. Circuit components such as a memory chip, a controller, etc. constituting a memory are mounted on a circuit board and housed in the hollow portion. The housing is formed of a material capable of a shape, such as a plastic, a wood, a metal, etc. The circuit components are electrically connected to electrical wiring of the USB male connector 6. The other end of the memory main body 2 is the solid portion, which is a part of the housing serving as a substantially ring-shaped cap holding member 7. As will be described later, the cap 3 is fitted into a circular space portion (protection member housing space portion) 8 of the cap holding member 7.

Figure 3:
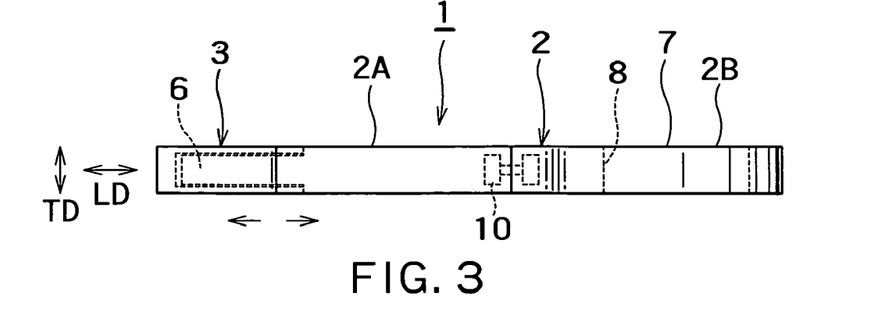
FIG. 3 is a side view of FIG. 1.

The aforementioned cap 3 for protecting the USB male connector 6 of the memory main body 2 is removably attached to the USB male connector 6. FIG. 1 and FIG. 2(a) show an attachment state and a removal state, respectively. As can be understood from FIG. 2(b), a connector housing space portion 3a for housing and supporting the USB male connector, which is a hollow portion, is formed within the cap 3, which has a thin columnar shape, from a part of the circumferential portion of the cap 3 toward the opposite side on the circumference of the cap 3. As can be understood from FIG. 2(*b*), beside the housing space portion 3*a*, the circumferential portion a extending from the part I to the part II of the cap 3 constitutes a complete circular shape. As will be described later, a projection or groove is formed on the portion a. FIGS. 2(*b*) and 2(*c*) show the sectional view and the side view of the cap 3, respectively. That is to say, FIG. 2(*c*) is a side view, viewing the cap 3 from the direction C in FIG. 2(*a*), and FIG. 2(*b*) is a sectional view of FIG. 2(*c*) taken along line B—B. The cap 3 removed from the memory main body 2 is fitted into the space portion 8 of the cap holding member 7 of the memory main body 2. The cap 3 and the housing portion 8 can roughly support each other by friction (close fit), or it is possible to prevent the removal of the cap 3 by a combination of a projection and a groove, which will be described later. In FIG. 1, the width direction WD is a direction along the width of the memory main body 1. In FIG. 3, the first direction LD is a direction along the axis of the memory main body 1, and the second direction TD is a direction along the thickness of the memory main body 1.

Figure 4:
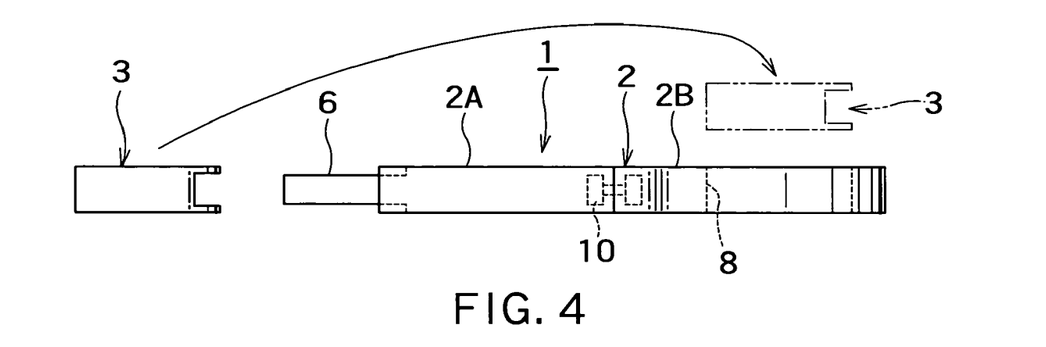
FIG. 4 is a side view of FIG. 2(a).
Figure 5:
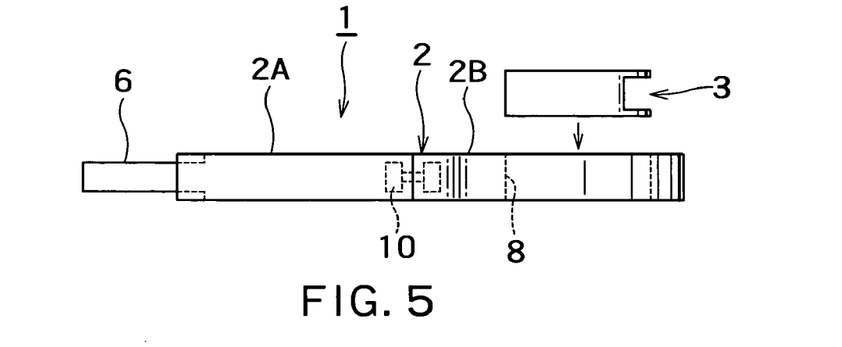
FIG. 5 is a drawing showing a step of a process in which the device of FIG. 1 changes into a usage state.
Figure 6:
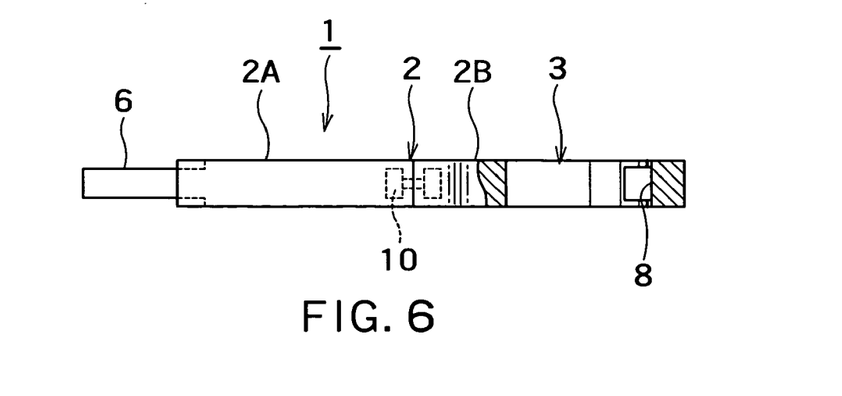
FIG. 6 is a side view of the device of FIG. 1 in a usage state.

The cap holding member 7 will be described below with reference to FIGS. 3 to 6. FIG. 3 is a side view of FIG. 1. In the state shown in FIG. 3, the cap 3 is removed from the memory main body 2, and moved above the space portion 8 (FIG. 4). Then, the cap 3 is fitted into the space portion 8 (FIG. 5), and supported by the cap holding member 7 of the memory main body 2 (FIG. 6). In the state shown in FIG. 6, the USB memory 1 is inserted into a USB female connector of a personal computer and used. Since the cap 3 is fitted into the memory main body 2, no external force is directly applied to the cap 3. Accordingly, even if an external force is applied to the USB memory 1, the removal of the cap 3 from the memory main body 2 can surely be prevented. After usage, the cap 3 is taken out of the memory main body 2, and put on the USB male connector 6. The cap 3 and the cap holding member 7 are attached to or detached from each other by elastic deformation of at least one of them.

Figure 7:
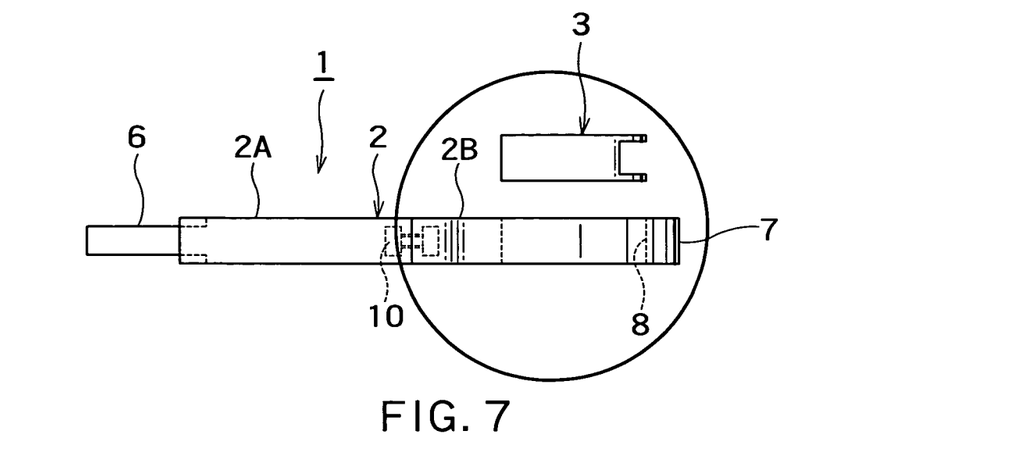
FIG. 7 is a drawing for explaining a modification of the device shown in FIG. 1.
Figure 8:
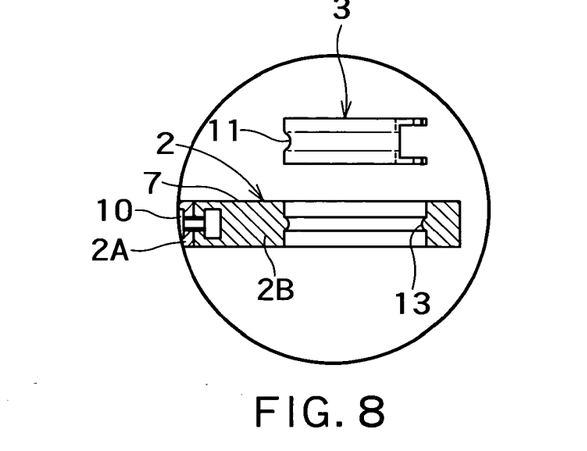
FIG. 8 is a partial sectional view showing a modification of a device shown in FIG. 1.
Figure 9:
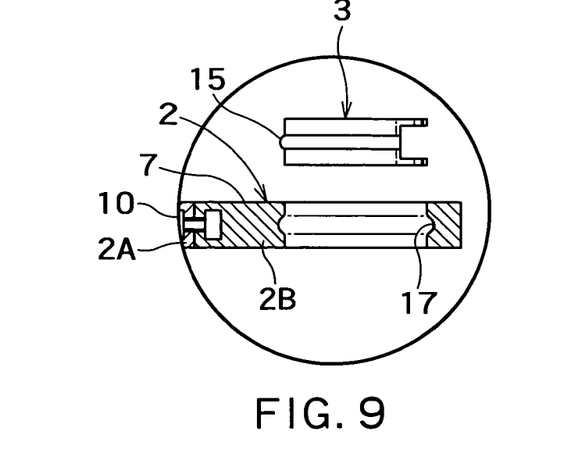
FIG. 9 is a partial sectional view showing another modification of the device shown in FIG. 1.
Figure 10:
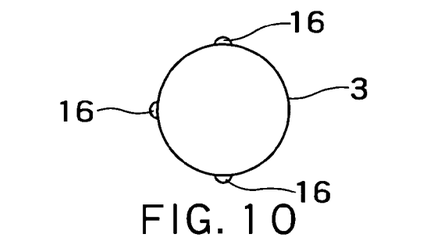
FIG. 10 is a plan view of a modification of a cap.
Figure 11:
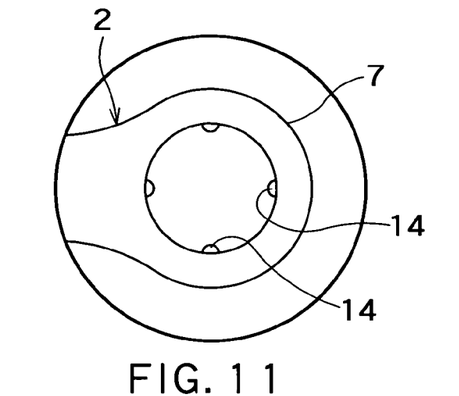
FIG. 11 is a partial plan view of a modification of a memory main body.

As is described before, the cap 3 and the cap holding member 7 can be roughly fixed to each other by close fit, as shown in FIG. 7. As is also described before, they can be fixed to each other by other kinds of separation preventing mechanisms for keeping the fixed state. This will be described with reference to FIGS. 7 to 11. FIGS. 8 to 11 show only the portion surrounded by a circle C in FIG. 7 and the cap. In FIG. 8, a groove (concave portion) 11 is formed on the entire circumferential surface (portion α) of the cap 3, and a projection (convex portion) 13 is formed on an internal surface constituting the space portion 8 of the housing of the memory main body 2. The projection 13 is formed on the entire internal surface. Furthermore, as shown in FIG. 11, the projection can be partial projections (pin-shape projections) 14 formed at predetermined intervals. Contrary to FIG. 8, a projection 15 can be formed on the portion a of the cap 3, and a groove 17 can be formed on the entire circumferential internal portion of the cap holding member 7. The projection of the cap 3 can be projections 16 formed on the portion a at predetermined intervals, as shown in FIG. 10. The aforementioned projections 13, 14, 15, 16 and the grooves 11 and 17 can be combined freely.

Figure 12:
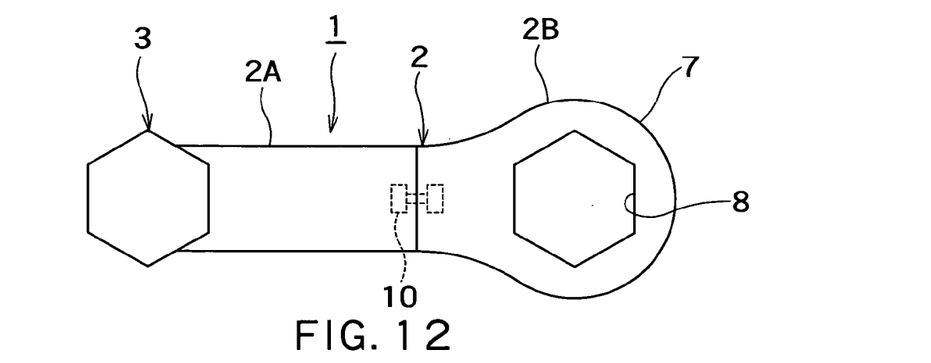
FIG. 12 is a plan view of a modification of the device shown in FIG. 1.
Figure 13:
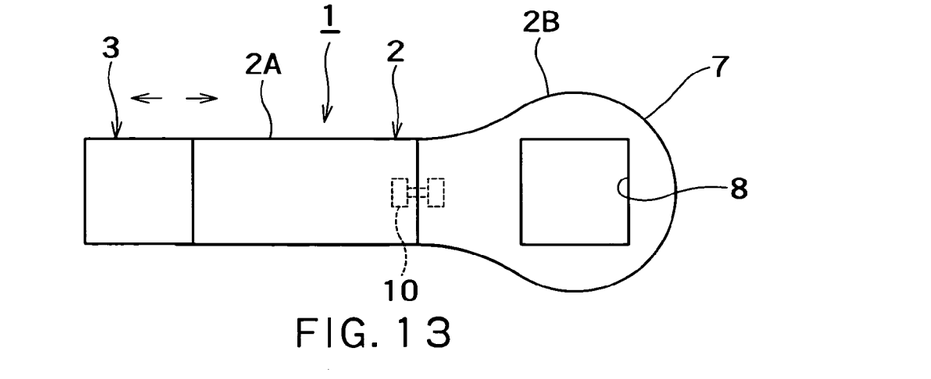
FIG. 13 is a plan view of another modification of the device shown in FIG. 1.

The plan views of the cap 3 and the space portion 8 are not limited to circular shapes, but can be of various shapes. FIG. 12 shows an example employing a hexagon, and FIG. 13 shows an example employing a rectangle.

Although a USB memory in which a cap is fitted into and held by a memory main body has been described, the present invention is not limited to such an example, but can be applied to various devices including USB connectors, e.g., a device in which a cartoon character is attached to a memory main body, and a device other than a USB memory.

Figure 16:
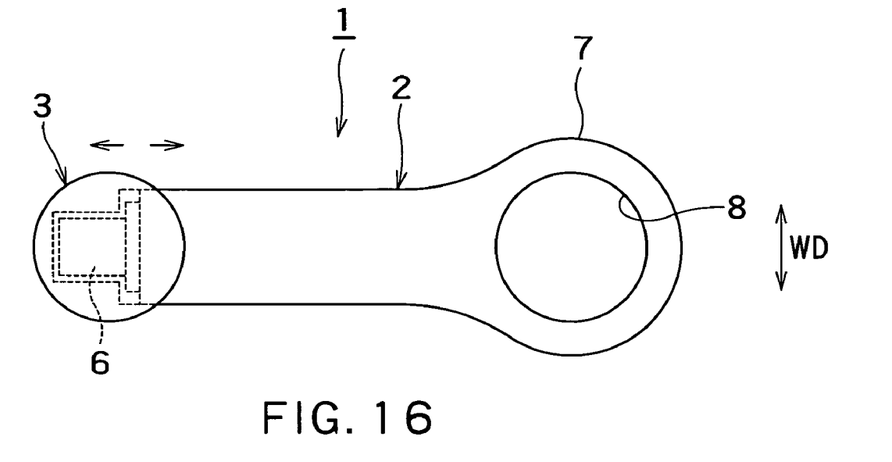
FIG. 16 is a plan view of another embodiment of the present invention.
Figure 17:
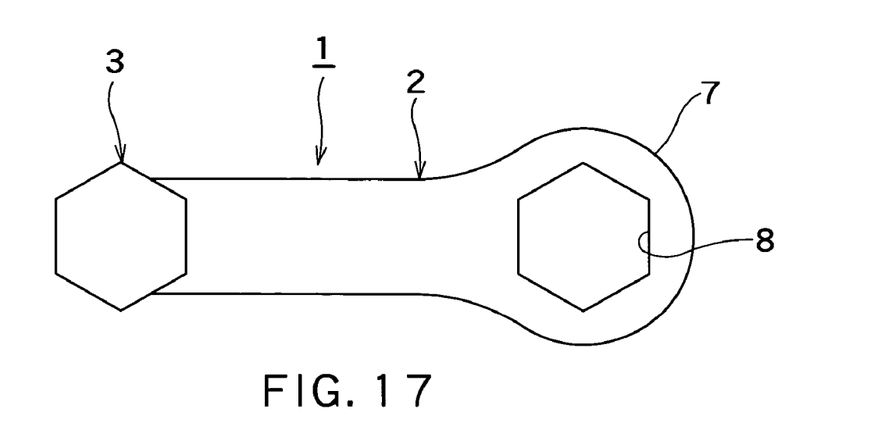
FIG. 17 is a plan view of a further embodiment of the present invention.
Figure 18:
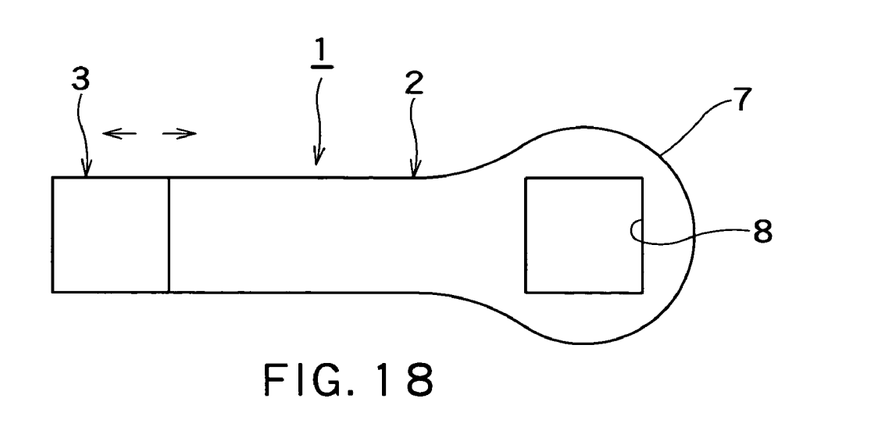
FIG. 18 is a plan view of a still another embodiment of the present invention.

The memory main body 2 should not be composed of the base member 2A and the rotation member 2B, but can be composed of a single member. FIGS. 16, 17, and 18 show such examples. FIGS. 16, 17, and 18 correspond to FIGS. 1, 12, and 13, and the same reference numerals are assigned to the same members.

The invention claimed is:

1. A device with a Universal Serial Bus (USB) connector comprising:
    a memory main body including therein at least a memory chip serving as a recording medium, and a USB connector electrically connecting to the memory chip provided at one end thereof; and
    a connector protection member removably connected to the USB connector in a first direction along an axis of the memory main body, protecting the USB connector in an attachment state, and removed in a usage state,
    the memory main body including a protection member housing space portion housing and holding the connector protection member in a removal state by receiving the connector protection member thereinto in a thickness direction of the connector protection member along a second direction perpendicular to the first direction, the protection member housing space portion penetrating the memory main body in the second direction.

2. The device with a USB connector according to claim 1, further comprising a separation preventing mechanism preventing a separation of the connector protection member fitted into the housing space portion from the memory main body.

3. The device with a USB connector according to claim 2, wherein the separation preventing mechanism has a convex portion formed on one of an outer circumference of the connector protection member and an internal circumference of the housing portion, and a concave portion formed on the other thereof.

4. The device with a USB connector according to claim 2, wherein the convex portion has pin-shape projections, and the concave portion has one or more grooves each in a shape capable of housing the projection.

5. The device with a USB connector according to claim 2, wherein the convex portion has arc-shape projections or a circular projection, and the concave portion has one or more grooves each in a shape capable of housing the projection.

6. A device with a USB connector comprising:
    a memory main body including therein at least a memory chip serving as a recording medium, and a USB connector electrically connecting to the memory chip provided at one end thereof; and
    a connector protection member removably connected to the USB connector in a first direction along an axis of the memory main body, protecting the USB connector in an attachment state, and removed in a usage state,
    the memory main body including a first member provided at a side of the USB connector, and a second member provided at a side opposite thereto, the first member and the second member being connected with each other so as to rotate relative to each other around an axis of the memory main body, and the second member having a protection member housing space portion housing and holding the connector protection member in a removal state by receiving the connector protection member thereinto in a thickness direction of the connector protection member along a second direction perpendicular to the first direction, the protection member housing space portion penetrating the memory main body in the second direction.

7. The device with a USB connector according to claim 6, wherein a first maximum width of the first member is smaller than a second maximum width of the second member.

8. The device with a USB connector according to claim 7, wherein a thickness of the second member is smaller than the first maximum width.

9. The device with a USB connector according to claim 6 further comprising an axis member, wherein the first member and the second member can rotate relative to each other by embedding both ends of the axis member in the first member and the second member.

10. The device with a USB connector according to claim 6, wherein each of the first member and the second member has a mechanism to stop a rotation at a predetermined position.

11. The device with a USB connector according to claim 6, further comprising a separation preventing mechanism preventing a separation of the connector protection member fitted into the housing space portion from the memory main body.

12. The device with a USB connector according to claim 11, wherein the separation preventing mechanism has a convex portion formed on one of an outer circumference of the connector protection member and an internal circumference of the housing portion, and a concave portion formed on the other thereof.

13. The device with a USB connector according to claim 12, wherein the convex portion has pin-shape projections, and the concave portion has one or more grooves each in a shape capable of housing the projection.

14. The device with a USB connector according to claim 12, wherein the convex portion has arc-shape projections or a circular projection, and the concave portion has one or more grooves each in a shape capable of housing the projection.

* * * * *